United States Patent Office 3,080,341
Patented Mar. 5, 1963

3,080,341
PROCESSES FOR CURING EPOXY RESINS
Albert G. Chenicek, Franklin Township, Allegheny County, and Frank G. Alster, Baldwin Borough, Pa., assignors, by mesne assignments, to Martin-Marietta Corporation, Chicago, Ill., a corporation of Maryland
No Drawing. Filed Dec. 16, 1959, Ser. No. 859,843
16 Claims. (Cl. 260—47)

The present invention is directed to two-component epoxy resin systems capable of curing at room temperature within a few minutes to provide castings, thick coatings or the like possessing a tack-free surface.

The present invention intends the application of two liquid components and these are desirably provided in approximately equal volumes to facilitate intimate admixture at the time of application, particularly when spray operation is intended. The two components may be mixed together either immediately prior to spraying or sprayed simultaneously from separate nozzles to obtain the desired mixture at the point of application.

In accordance with the invention a first liquid component is provided containing a polyepoxide which is preferably a polyglycidyl ether. The viscosity of the first liquid component is desirably reduced by the presence of a mobile liquid diluent which is inert with respect to the polyepoxide but which is desirably reactive in the final mixture to be formed, such a diluent being illustrated by a liquid monoepoxide such as butyl glycidyl ether. The second liquid component contains a catalyst mixture dissolved in a liquid carrier which is not affected by the catalyst, preferably a polyhydric alcohol, illustrated by polypropylene glycol. The catalyst mixture is selected in accordance with the invention to provide a rapid low temperature cure and a tack-free surface. Conventional catalysts for epoxy resins are not adapted to provide the cure desired by the invention.

In accordance with the invention the catalyst mixture comprises a boron trifluoride complex selected from the group consisting of etherates, phenolates and carboxylates in admixture with a polyvalent metal polyhalide salt or a hydrate thereof. The polyvalent metal is preferably in its highest state of valence, preferred salts being illustrated by $SnCl_4$, $AlCl_3$, $ZnCl_2$, $FeCl_3$ and $SbCl_5$. Corresponding polyvalent metal polyhalides in which the polyvalent metal is not in its highest state of valence are also usable, e.g., stannous chloride. The polyvalent metal need not be one which is known to possess catalytic activity and even $CaCl_2$ and $MgCl_2$, particularly in the form of hydrates, may be used to eliminate the normal tacky surface produced when a boron trifluoride catalyst is employed alone. The halide is preferably a chloride but the corresponding bromides, iodides and even fluorides may be used. Anhydrous salts are preferred since these have greater activity but hydrates of the salts named are also effective and are preferred in some instances because of the enhanced solubility of the hydrate in comparison with the corresponding anhydrous salt. The various salts or their hydrates are effective alone or in admixture with one another and the term salt is intended to include salt hydrates.

The specified combinations of catalysts uniquely provide a rapid room temperature cure and a tack-free surface, whereas the individual catalysts which are combined as well as other conventional epoxy resin catalysts are ineffective for the intended purpose.

The polyepoxides which are used in the first liquid component in accordance with the invention may be any polyepoxide having a 1,2 epoxy equivalency in excess of 1.3, preferably in excess of 1.4, the most preferred polyepoxides being polyglycidyl ethers having an epoxy equivalency of about 2.0 although epoxy resins having higher epoxy equivalencies may be used.

The polyepoxide of the first liquid component is intended to enter into a rapid exothermic curing reaction initiated at room temperature when it is intimately mixed with the catalyst mixture contained in the second liquid component. To insure rapid and thorough physical combination between the two liquid components, these components should be mixed together in a volume ratio of from 1:10 to 10:1, more preferably in approximately equal volumes.

It should be understood that reference to a two-component system is intended to mean two essential components, it being permissible to have some of the components of the final mixture supplied from third or even fourth components which may be liquid or solid.

The polyepoxide is preferably a polyglycidyl ether. Particularly preferred polyglycidyl ethers for use in accordance with the invention are polyglycidyl ethers of aromatic polyhydric compounds, particularly dihydric phenols and more particularly dihydric bisphenols such as bisphenol A. The term bisphenol designates a pair of monohydric phenolic groups joined together through a divalent alkylene group.

It is especially preferred for ease of application, particularly by spray, to employ substantially diglycidyl ethers of bisphenols having a molecular weight in excess of 300 and which are still of low enough molecular weight to be liquid at room temperature. Thus, the polyglycidyl ether of bisphenol A having a molecular weight in the range of 350–400 and an epoxy equivalency of about 0.5–0.54 prepared in accordance with the instructions set forth in the section designated "polyether A" in the United States Patent to Shokal et al., 2,643,239, dated June 23, 1953, may be employed. Similarly, the diglycidyl ether reaction product of bisphenol A with epichlorohydrin having a molecular weight of 370 and an epoxy value of 0.54 may be used to advantage, this material being designated "epoxy resin A" in the examples of this application. Polyglycidyl ethers of bisphenol A of higher molecular weight may also be used, the products of lower molecular weight and particularly those which are liquid at room temperature being preferred. However, solid polyglycidyl ethers may also be used by the incorporation in the first component of liquid diluents and even, though less desirably, by the inclusion of solvents which evaporate during the exothermic room temperature cure.

While polyglycidyl ethers having an aromatic backbone are preferred, aliphatic polyglycidyl ethers may also be used. A suitable aliphatic polyglycidyl ether is polyether B described in the United States Patent to Condo et al., 2,752,269. To further illustrate aliphatic polyglycidyl ethers which may be used, reference is made to 1,4-butane diol diglycidyl ether and to the triglycidyl ether of trimethylol propane.

To illustrate polyepoxides which are not polyglycidyl ethers and which may be used in accordance with the invention, reference is made to the product EP–201 (Carbide & Carbon) which contains about 92% by weight of

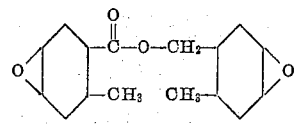

in which the 1,2 epoxy groups are cyclohexyl epoxy groups. The remaining 8% is a mixture of products similar to that pictured above and in which oxidation has proceeded excessively or in which only a single cyclohexyl epoxy group is formed as a result of insufficient epoxidation.

Also, epoxidized oils, such as soya bean oil epoxidized with peracetic acid to provide an epoxy equivalency of about 0.37 equivalent per 100 grams, may be cured in accordance with the invention.

It is desired to point out that application of the polyepoxide component in accordance with the invention is preferably effected at room temperature, the most important aspect of this being the fact that coatings or castings can be permitted to cure without baking which is of considerable commercial importance. It will be appreciated, however, that the mixtures produced in accordance with the invention may be baked if baking equipment is conveniently at hand. Moreover, thick films may be coated upon metal or other objects and allowed to cure without employing a baking oven or preheating the object to be coated. In this way, the advantage of vinyl plastisol application is achieved without the utilization of elevated temperatures which is essential to cause the dispersion resin particles in the plastisol to coalesce, fuse together and cure. On the other hand, room temperature application does not necessarily require that the polyepoxide component be sprayed, for example, from a liquid source maintained at room temperature. To the contrary, the polyepoxide component may be heated prior to admixture with the other components of the system and the use of heat facilitates the employment of unduly viscous or normally solid polyepoxides.

As indicated, the epoxy resin component may be either normally liquid or normally solid. In either event, a diluent is desirably employed to either dissolve the solid epoxy resin or to thin the liquid epoxy resin component to lower its viscosity. The diluent may be any liquid material which is inert with respect to the epoxy resin component at room temperature and in the absence of a curing agent for the epoxy resin. Thus, butyl glycidyl ether constitutes a particularly preferred diluent as does styrene. Other liquid monoepoxy compounds such as allyl glycidyl ether, phenyl glycidyl ether, styrene oxide, 1,2-hexylene oxide, glycide or the like may be employed. Still other liquid components may be used as diluent, these being illustrated by cyano-substituted hydrocarbons such as acetonitrile, propionitrile, adiponitrile, benzonitrile and the like. Liquid chemical plasticizers may also be used, these being hydrocarbon esters of dicarboxylic acids such as diethyl, dibutyl or dioctyl esters of phthalic or sebacic acids.

Additionally, various polyols may be used to thin the polyepoxide component. Thus, a minor portion of polypropylene glycol having a molecular weight of 425 may be mixed with the polyepoxide to reduce its viscosity or the polyepoxide may be produced in the presence of the glycol to form polyepoxides of unusually low viscosity as taught in the copending application of Bruno Perfetti, Serial No. 822,755, filed June 25, 1959.

It is preferred in accordance with the invention to employ a diluent which remains in the coating or casting which is formed thus providing liquid mixtures which contain 100% solids. Despite the preference to avoid vaporizable components, various volatile solvents are suitable, these solvents escaping from the mixtures produced in the invention either during application (loss of solvent during spray) or during the cure. It will be appreciated that the curing reaction achieved by the invention is exothermic and the heat of the reaction assists in the vaporization of any volatile solvent which may be present. Volatile solvents are illustrated by ketones like acetone, methyl ethyl ketone, methyl isobutyl ketone, isophorone, etc.; esters such as ethyl acetate, butyl acetate, Cellosolve acetate (ethylene glycol mono ethyl ether acetate), methyl Cellosolve acetate (acetate of ethylene glycol monomethyl ether), etc.; ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons, such as benzene, toluene, xylene, etc.

The liquid carrier for the catalyst mixture may be any liquid inert to the catalyst mixture but is preferably an organic compound possessing a plurality of aliphatic hydroxyl groups. Examples of these liquid polyols include, among others, diethylene glycol, triethylene glycol, polyethylene glycol having a molecular weight of about 400, dipropylene glycol, tripropylene glycol, pentopropylene glycol, hexanetriol-1,2,6, polyallyl alcohol having a molecular weight of about 500, polyvinyl alcohol, glycerol, alpha-methoxyglycerol, alpha-methyl glycerol, 1,3,6-octanetriol, trimethylolpropane and the like and mixtures thereof.

Particularly preferred polyols are the aliphatic polyhydric alcohols having a molecular weight of at least 100, and more preferably polyalkylene glycols (preferably polyethylene or polypropylene glycols) having a molecular weight in the range of from 100 to 600 and which have a viscosity ranging from about 25 centipoises to about 200 centipoises measured at room temperature. When more viscous polyols are used, these may be thinned with chemical plasticizers or volatile solvents or by admixture with other less viscous polyhydroxy compounds.

It is preferred in accordance with the invention that at least one of the hydroxyl groups of the aliphatic polyol be a primary hydroxyl group but the remaining hydroxyl group or groups are not subject to this requirement. Thus, the invention achieves outstanding results using polypropylene glycol produced from 1,2-propylene oxide and polypropylene glycol having a molecular weight of 425 constitutes the presently preferred polyhydroxy compound for use in the invention. The presence of an aliphatic polyol having at least one primary hydroxyl group appears to speed the room temperature cure achieved by the invention.

The diluents and liquid carriers which have been specified are preferably essentially neutral to minimize interference with the acidic cure which is achieved in accordance with the invention.

The proportion of boron trifluoride complex and polyvalent metal halide salt which is used in accordance with the invention may each vary from about 0.5 to about 5.0% by weight based on the weight of the epoxy resin component which is employed. Thus, the total catalyst concentration may vary from about 1.0–10.0% by weight. From the standpoint of the second component, the proportion of each component of the catalyst mixture is preferably from 1.0–10.0% by weight based on the weight of aliphatic polyol in which it is dissolved.

The minimum proportion of each component of the catalyst mixture will vary somewhat depending upon the specific catalyst components which are selected, the proportion of diluent, the reactivity of the selected epoxy resin and the temperature of the atmosphere. It will also be appreciated that the larger the proportion of catalyst, the faster will be the cure. Accordingly, while the minimum proportion of catalyst component which has been specified is not a precise limit, either this proportion or a slightly greater proportion will be found to be effective. The upper limit of catalyst concentration is decided by such factors as the desirable cure time and catalyst cost. Generally speaking, it is preferred to employ less than 4% by weight of total catalyst based on the weight of the epoxy resin but higher proportions may be used, the maximum value of 10% by weight representing an upper limit which is not desirably exceeded in commercial practice. It is also preferred to employ the two components of the catalyst mixture in a weight ratio of from 1:5 to 5:1 with respect to one another.

The invention is illustrated but not limited by the examples which are set forth in the table which follows in which all parts are by weight. In each example the first liquid component contained 61 parts of "epoxy resin A" thinned with 8.5 parts of butyl glycidyl ether and the second liquid component is identified in the table. In each instance an exothermic reaction occurred producing a solid product substantially free of surface tack as evidenced by finger touch. The product was produced by stirring together the first and second liquid components and immediately pouring the mixture into an aluminum foil cup 1 inch in diameter to a depth of ½ inch. The cure time reported in the table represents the number of minutes required to convert the pourable liquid mixture to a solid product free of surface tack.

operation takes place automatically upon spraying and a hot film may be formed which will cure without baking at a thickness of less than 1/10 inch. Impregnated glass fabrics are quickly laminated without heat and large objects can be formed by simultaneously spraying a mold form with glass fibers and the mixtures of the invention Table

| Example | Second Component | | | | Cure Time (Minutes) |
|---|---|---|---|---|---|
| | Liquid Carrier | Modifier | Catalyst | | |
| | | | BF₃ Complex | Polyvalent Metal Halide | |
| 1 | polypropylene glycol 425—30.5 | | etherate 0.37 | SnCl₄.5H₂O 0.46 | 3 |
| 2 | ......do...... | | ......do...... | SnCl₄ 0.46 | 1 |
| 3 | ......do...... | | etherate 0.93 | AlCl₃ 0.31 | 2 |
| 4 | ......do...... | | etherate 2.20 | ZnCl₂ 0.69 | ¹1 |
| 5 | ......do...... | | etherate 0.91 | FeCl₃ 1.15 | 2 |
| 6 | ......do...... | | phenolate 0.74 | SnCl₄.5H₂O 0.46 | 4 |
| 7 | ......do...... | | acetate 0.37 | SnCl₄.5H₂O 0.46 | 3 |
| 8 | 1,2,6 hexane triol—30.5 | | etherate 0.56 | SnCl₄.5H₂O 0.69 | 9 |
| 9 | 1-4 butane diol—16.7 | | etherate 0.74 | SnCl₄.5H₂O 0.46 | 4 |
| 10 | polypropylene glycol 425—30.5 | dioctyl phthalate 4. | etherate 0.37 | SnCl₄.5H₂O 0.46 | 6 |
| 11 | ......do...... | | etherate 1.11 | FeCl₃.6H₂O 1.15 | 4 |
| 12 | ......do...... | | ......do...... | SnCl₂.2H₂O 1.15 | 6 |
| 13 | dibutyl Carbitol—30.5 | | ......do...... | SnCl₄.5H₂O 1.15 | 2 |
| 14 | polypropylene glycol 425—30.5 | | ......do...... | MgCl₂.6H₂O 0.58 | 6 |

¹ Very slight surface tack.

In contrast with the rapid room temperature cures providing tack-free surfaces in accordance with the invention, the boron trifluoride complexes by themselves provided castings with tacky surfaces. The various polyvalent metal halide salts listed in the table provided slow room temperature cures requiring about 1 hour. Addition of amine curing agents to the boron trifluoride complexes provided tack-free castings but about 2 to 3 hours was required. Phosphoric acid and toluene sulfonic acid were tried but the effectiveness of these did not compare with the Lewis acid halide salts used in the table. Amines such as diethylene triamine in an amount of 12% based on the weight of epoxy resin cured very slowly at room temperature (about 16 hours). Boron trifluoride aminates are not effective in accordance with the invention.

The room temperature cures achieved by the invention apply to coatings as well as castings but the coating should be at least 1/10 inch thick in order to permit the exothermic reaction to properly develop in normal room temperature surroundings of about 78° F. At more elevated ambient temperatures or by the use of heat lamps or similar expedients to produce more elevated surface temperatures, still thinner coatings can be cured. When baking temperatures in excess of about 200° F. are applied, films of any thinness can be cured within a few minutes.

By rapid cure is meant the achievement of a solid product within 15 minutes, preferably within about 6 minutes.

Various other materials may be incorporated in the final mixtures provided by the invention for the purpose of improving specific properties or for decorative purposes. Thus, pigments, fillers, dyes, reinforcing agents such as glass fibers, asbestos and sand, etc., may be mixed with one or more of the liquid components of the invention or supplied separately.

The invention provides quick curing casting materials for diverse application and is of outstanding utility in coating, laminating and processes akin to molding. Thus, thick resin layers may be quickly spray applied to metal objects such as iron pipe and rapidly cured without preheating the object and without baking. Thick layers are easily applied in the field providing desirable maintenance finishes for steel structures, tanks and other objects. By preheating one or more of the liquid components and by effecting admixture of the components by simultaneously spraying these from separate spray guns, the mixing thus eliminating expensive lay-up procedures as well as lengthy or expensive curing cycles. Resilient layers can be formed providing in-situ production of gaskets. Any metal surface can be coated including tin, aluminum and zinc. Non-metal surfaces such as glass, plastics of various types and wood can be coated. Synthetic and natural fibers of all types can be incorporated in the coatings and castings which are produced. Surfaces such as concrete which provide an alkaline surface require a barrier coating to be applied first since the alkaline surface inhibits the acidic curing reaction employed in the invention.

The invention is defined in the claims which follow:

We claim:

1. A method of rapidly curing a polyepoxide having a 1,2 epoxy equivalency in excess of 1.3 to provide a solid product having a substantially tack-free surface comprising intimately admixing said polyepoxide with a liquid component containing as the essential catalytic agent for curing said polyepoxide, dissolved boron trifluoride complex selected from the group consisting of etherates, phenolates and carboxylates and a polyvalent metal polyhalide salt, each of said boron trifluoride complex and polyvalent metal polyhalide being present in said admixture in an amount of from 0.5 to 5.0% by weight based on the weight of said polyepoxide.

2. A method as recited in claim 1 in which said mixture is formed into a layer at least 1/10 inch thick and is exposed to room temperature conditions.

3. A method as recited in claim 1 in which said polyepoxide is supplied as a liquid and said liquid component is an essentially neutral organic liquid, said polyepoxide and said liquid component being admixed in a volume ratio of from 1:10 to 10:1.

4. A method as recited in claim 1 in which said organic liquid consists essentially of a polyol having a plurality of aliphatic hydroxyl groups.

5. A method as recited in claim 1 in which said polyepoxide is a low viscosity liquid, the viscosity of said polyepoxide being reduced by the presence of mobile liquid diluent inert with respect to said polyepoxide.

6. A method as recited in claim 5 in which said diluent is reactive in the admixture of said polyepoxide with said liquid component.

7. A method as recited in claim 6 in which said diluent is a monoepoxide.

8. A method as recited in claim 1 in which said polyvalent metal polyhalide salt is selected from the group consisting of $SnCl_4$, $AlCl_3$, $ZnCl_2$, $FeCl_3$, $SbCl_5$ and hydrates thereof.

9. A method as recited in claim 1 in which said polyepoxide is a polyglycidyl ether of aromatic polyhydric compound and said boron trifluoride complex and said polyvalent metal polyhalide are present in a weight ratio of from 1:5 to 5:1.

10. A method as recited in claim 9 in which said aromatic polyhydric compound is a bisphenol and said polyglycidyl ether has a molecular weight in excess of 300 and is liquid at room temperature.

11. A method as recited in claim 9 in which said polyglycidyl ether is mixed with a liquid monoepoxide to reduce its viscosity.

12. A method as recited in claim 11 in which said monoepoxide is butyl glycidyl ether.

13. A method as recited in claim 9 in which styrene is employed to reduce the viscosity of said polyglycidyl ether.

14. A method as recited in claim 9 in which said aliphatic polyol is a polyalkylene glycol having a molecular weight of at least 100 and a viscosity measured at room temperature of from 25–200 centipoises.

15. A method as recited in claim 14 in which said polyalkylene glycol is polypropylene glycol having a molecular weight of about 425.

16. A method of rapidly curing a polyepoxide having a 1,2 epoxy equivalency in excess of 1.3 to provide a solid product having a substantially tack-free surface comprising intimately admixing a first liquid component consisting essentially of diglycidyl ether of bisphenol A diluted with butyl glycidyl ether and a second liquid component consisting essentially of polypropylene glycol having a molecular weight of about 425, said second liquid component containing, as the essential catalytic agent for curing said polyepoxide, dissolved boron trifluoride etherate and $SnCl_4 \cdot 5H_2O$, each of said boron trifluoride etherate and $SnCl_4 \cdot 5H_2O$ being present in said admixture in an amount of at least 0.5% by weight, based on the weight of said diglycidyl ether and in a total amount of less than 4% by weight on said basis, and the weight ratio of said first component to said second component being about 2:1.

References Cited in the file of this patent

UNITED STATES PATENTS

| | | |
|---|---|---|
| 2,555,500 | Morehouse et al. | June 5, 1951 |
| 2,824,083 | Parry et al. | Feb. 18, 1958 |

FOREIGN PATENTS

| | | |
|---|---|---|
| 792,702 | Great Britain | Apr. 12, 1958 |